United States Patent Office 3,594,462
Patented July 20, 1971

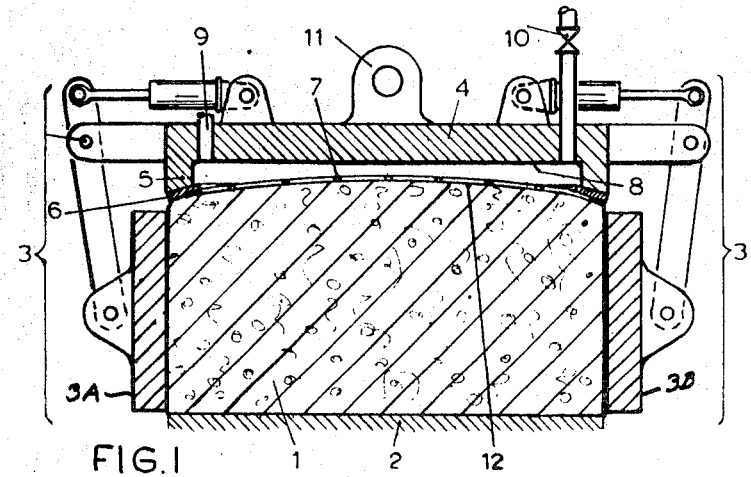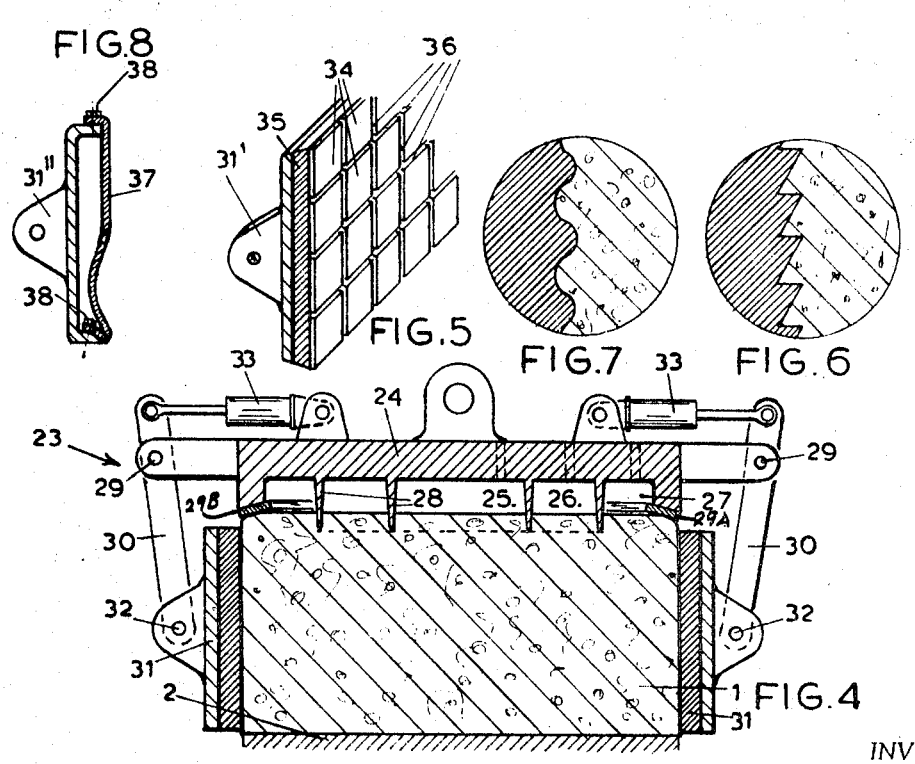

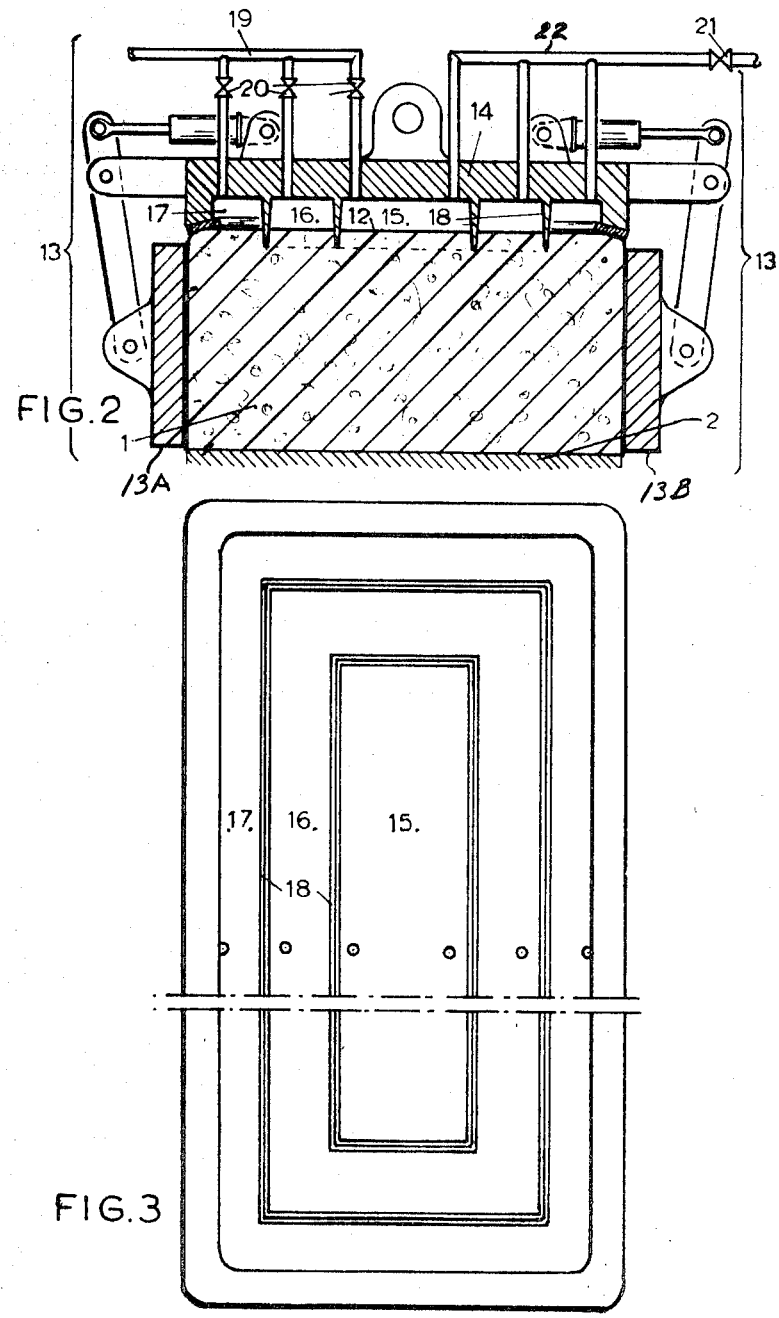

3,594,462
METHOD OF MAKING ARTICLES FROM
MATERIAL IN A PLASTIC STATE
Berend Vrijma, Vuren, Netherlands, assignor to Fabriek van Bouwmaterialen "Loevestein" N.V., Gorinchem, Netherlands
Continuation-in-part of application Ser. No. 523,183, Jan. 26, 1966. This application May 13, 1969, Ser. No. 824,228
Claims priority, application Netherlands, Feb. 3, 1965, 6501347
Int. Cl. B28b 13/06
U.S. Cl. 264—90
2 Claims

ABSTRACT OF THE DISCLOSURE

The method is provided wherein a block of material in the plastic state, e.g. lightweight concrete, is prepared in a mould, is transferred by a lifting device from the bottom of the mould to a cutting table, the opposite sides of the block being supported by panels or clamping jaws. At the cutting station, the block is cut into pieces and allowed to set. The method is characterized by the use of suction means, whereby a lifting suction is applied to the top surface of the block to aid in lifting the block in a relatively soft state without destroying it during transport.

This invention relates relates to a method of making articles from material in the plastic state, more particularly, aerated cement, in which a large block of material in the plastic state is successively prepared in a mould, transferred by a device with clamping jaws from the base base of the mould to a cutting table, is cut into pieces on the table and allowed to set. This application is a continuation-in-part of application Ser. No. 523,183, filed Jan. 26, 1966, and now abandoned.

A method of this kind is disclosed in German patent specification 966,769 and is improved by the invention.

The method according to the invention is characterized in that during the transfer of the block, suction is maintained between the top surface of the block and a surface of the device. This greatly reduces the risk of damage to the block during transfer. In comparison with the known method, only a very small clamping force need be exerted, if any, upon the side walls of the block in order to retain the block. By reason of the method of the invention, the integrity of the internal structure of the large block of material in the soft plastic state is retained.

Accordingly, with the method provided by the invention, the block of material in the plastic state can be transferred from the bottom of the mould to the cutting table at an earlier stage, that is to say, while the block is still relatively soft. This is very important because a soft block can be cut more accurately and with less risk of breakage of the cutting wires than when cutting a harder block. The invention also provides a new apparatus for performing the method according to the invention. This apparatus is characterized by a surface which covers at least a large part of the top surface of the block, the surface having means for maintaining suction between it and the top surface of the block during the transfer of the block of material in the plastic state to the cutting table. Opposite sides of the block may be supported by panels or gripping jaws provided with means which penetrate and conform deformably to the sides of the block during transfer to the cutting table.

The invention also covers articles made from material in the plastic state, more particularly, lightweight concrete, by the use of the method according to the invention.

It should be noted that the application of suction to part of the surface of a block of plastic material is disclosed in German patent specification 1,134,618. In the method according to this German patent specification the block of material in the plastic state is, however, transferred quite differently from the bottom of the mould to the cutting table.

The above and other features of the invention will be explained in the following description with reference to the drawing in which, by way of example:

FIG. 1 is a cross section through apparatus according to the invention;

FIG. 2 is a cross section through a different apparatus according to the invention;

FIG. 3 is a bottom view of the apparatus shown in FIG. 2;

FIG. 4 is a cross section through another apparatus according to the invention;

FIG. 5 is a variant of a part of the apparatus according to FIG. 4;

FIG. 6 is an enlarged scale cross section of a detail of the apparatus according to FIG. 4;

FIG. 7 is a similar cross section to FIG. 6, of a variant of the detail shown in FIG. 6; and FIG. 8 is another embodiment of a part of the apparatus according to FIG. 4.

In FIG. 1, reference 1 denotes a large block of material in the soft plastic state, for example, lightweight concrete, prepared by pouring this material as a liquid into a mould, allowing it to rise and become plastic therein. When the block 1 has sufficient cohesion, the side and top walls of the mould are removed, the block borne by the bottom 2 of the mould is transferred to the cutting table of a cutting machine, cut into pieces by means of a number of cutting wires, and finally set by steam in a setting tank. The transfer of the block of material in the plastic state from the bottom 2 of the mould to the cutting table (not shown) is carried out in a different way according to the invention from the known method, so that only the new method of transfer and the special means applicable thereto are described in detail hereinafter.

The gripper assembly 3 shown in FIG. 1 for supporting block 1 during the transfer operation comprises a cap or hood 4 which covers the entire upper surface of block 1, which is quite large, for example 6 m. long, 1 m. high and 2 m. wide, the gripper having a pair of jaws or panels 3A and 3B. The downwardly extending peripheral edges or flanges 5 of the hood have an elastic sealing material 6, for example, foam rubber or foam plastic, on the underside. However, any means for effecting a seal can be employed. The underside of the cap or hood 4 is bounded by gauze 7. The space beneath the under surface 8 of the cap or hood is connected by a closable flexible pipe 9 to a suction pump and may or may not be connected to atmosphere via an air valve. The gripper can be suspended from a hoisting mechanism by means of bosses 11. For transfer of the block 2, the cap or hood 4 is placed on the top surface 12 of the block 1, the edges of the block being sealed against the edges of cap or hood 4 by means of sealing strip 6. Suction is then applied to the space between top surface 12 of the block and the under surface 8 of the cap, following which the gripper 3 is closed and, together with the block 1, clamped therein and sucked by vacuum thereagainst, transferred to above the cutting table and lowered onto the same by a hoisting mechanism. The gripper 3 is then opened and the suction in the cap 4 terminated by closing off pipes 9 and opening air valve 10.

The gripper assembly 13 shown in FIGS. 2 and 3 differs from the gripper 3 in that the space beneath the cap or hood 14 is divided by continuous downwardly extending walls 18 into a number of chambers 15, 16 and 17 located adjacent each other. Each of the chambers 15, 16 and 17 is connected separately to a suction pipe 19 via a non-return valve 20. When the valve 21 is open, these chambers communicate with atmosphere via pipe 22. To pick up the block via clamping jaws 13A, 13B, gripper assembly 13 is placed relative to the block so that its cap or hood 14 is adjacent the top surface 12 thereof and, with valve 21 closed and non-return valves 20 open, air is drawn out of the chambers 15, 16 and 17 so that an appreciable vacuum forms in these chambers. Under these conditions, downwardly extending walls 18 penetrate beneath the top surface 12 of the block and into the top crust thereof to effect a substantially vacuum tight seal. This is not a drawback, since this crust is cut off in any case when the block is cut into pieces. If any edge of the block is situated at a lower level at any point or if during transfer any edge of the block breaks away locally for some reason, so that air penetrates along the edge of the block and into the chamber 17, so that the air pressure in the pipe 19 increases, the non-return valves 20 close tightly so that the negative pressure in the chambers 15 and 16 is maintained. After the block 1 has been placed on the cutting table, the gripper 13 is opened, the valve 21 is opened, and the gripper 13 is removed.

Preferably, during transfer, an increasing vacuum is created in the chambers from the outside to the inside, so that the air pressure in the chambers 15, 16 and 17 is, for example, respectively 0.9, 0.8 and 0.7 atmosphere. This is possible by connecting the chambers 15, 16 and 17 to the pipe 19 via control valves set to the said pressure.

The gripper assembly 23 with clamping jaws 31 shown in FIG. 4 has a cap or hood 24 with chambers 25, 26 and 27 separated from one another by walls 28. The outer peripheral edges or flanges 29A of cap or hood 24 bear in sealing-tight relationship against the top edges of the block 1 by means of strips 29B. The control of the air pressure in the chambers 25, 26 and 27 and the means for this purpose are the same as those for the air pressure in the chambers 15, 16 and 17.

Like gripper assemblies 3 and 13, gripper assembly 23 also has four gripper arms 30 which are mounted to pivot about pivots 29 in the cap or hood 24, two clamping jaws 31 which are each borne by two gripper arms 30 and which are lowerable about the pivots 32 with respect to the gripper arms, and two hydraulic cylinders 33 to drive the gripper arms. Unlike the clamping jaws of the grippers 3 and 13, the clamping jaws 31 are covered with a layer of elastic material, for example, rubber or foam rubber, so that the inner walls of clamping jaws 31 can adapt themselves more satisfactorily to any curvature in the side surfaces of block 1.

To transfer the block 1 by means of the gripper assembly 23, a negative pressure is created in the chambers 25, 26 and 27 in the manner hereinbefore described and the block 1 is also clamped with a small clamping force between the clamping jaws 31. The block 1 can thus be transferred in a very soft state from the bottom 2 of the mould to the cutting table, after which the block can be very accurately cut in a very soft state. If a block of material in the plastic state is already relatively hard, cutting wires tend to deviate from a straight path and even to break so that an important advantage of the invention is the fact that the block 1 can be cut at an early stage.

The pivots 32 and hence the resultant clamping force are situated below the middle of the clamping jaws 31 to give good distribution of the clamping pressure in the block 1. Clamping jaws 31 need not be pivotable in the gripper arms but may be secured rigidly thereto. By the pivoting movement of the clamping jaws 31 about the pivots 29, the underside of each clamping jaw moves a very slight distance more in the clamping direction of the block than the top of the same clamping jaw so that the underside of the block is slightly compressed more than the top and hence is subjected to a greater clamping force.

As examples of various embodiments of clamping jaw constructions, reference is made to FIGS. 5 to 8. Thus, referring to FIG. 5, a number of clamping plates 34 are secured to clamping jaw 31' with the interposition of a layer of rubber 35. Thus, clamping plates 34 can adjust or yield to the curved side surfaces of the block 1. Clamping plates 34 are separated from one another by grooves 36. The longitudinal grooves 36 increase the vertical frictional force between the block 1 and the clamping jaw 31' due to partial penetration of the plates into the sides of the block. When longitudinal grooves or ribs are provided, the clamping force of the clamping jaws can be reduced.

FIGS. 6 and 7 illustrate preferred embodiments of the rubber inner wall of a clamping jaw according to the invention having means which penetrate and conform deformably to the sides of the soft plastic block. In FIG. 6, this inner wall is sawtooth-shaped. In FIG. 7, the inner wall has contiguous semicircular grooves and ribs in the form of corrugations. The height and depth of the ribs or grooves need only be small to provide considerable friction between the block and the clamping jaw.

The clamping jaw 31" shown in FIG. 8 consists of an elongate box which, at the side adjacent to the block 1, is shut off by a rubber diaphragm 37. The latter is secured to the edges of the clamping jaw 31" by means of strip 38 so as to be sealing-tight. The clamping jaw 31" is filled with a fluid-like medium or is connected via a valve to a compressed air or pressure fluid pipe. Preferably, there is also a fluid in the clamping jaw 31" of a specific gravity similar to the specific gravity of the material in the plastic state. When a block of material in the plastic state is clamped between two clamping jaws 31", the diaphragm 37 fits snugly against any curved side surfaces of the block. Because of the hydrostatic pressure of the fluid in the box, the diaphragm exerts a greater pressure on the underside of the block, and this is favorable in view of the higher internal hydrostatic pressure at the underside of the block.

As will be appreciated, one aspect of the invention is the provision of a method of manufacturing articles from lightweight concrete. The steps comprise, forming a mass of lightweight concrete by pouring a concrete mix thereof in substantially the liquid state into a mould, allowing the mix to set and form a soft plastic block in the mould sufficient to sustain its own shape, and holding at least one set of panels of a lifting means or device in engaging relationship with opposed side surfaces of the soft plastic block, the lifting means having a suction-operable hood, the surface of which runs adjacent to and along the top surface of the soft plastic block. The hood makes sealing contact with the top surface of the soft plastic block, the suction being applied to the top of the block while the hood is in sealing arrangement therewith. Thereafter, the soft plastic block is lifted and transported with minimum risk of damage while supporting the block simultaneously by suction and by engaging relation of the set of side panels.

The advantages to be achieved by the invention will be apparent from the following:

For one thing, the block of lightweight concrete in the soft plastic state can be transferred from the mould without fear of damaging the large soft block. As will be appreciated, this means there is shorter mould time for each moulding operation, thus requiring fewer moulds and less space for storing the moulds in the factory.

Even though the concrete block is in a soft plastic state, the transfer of the block by means of suction enables the use of supporting side panels or clamping jaws with low clamping pressures which reduces chance of damage.

Because the soft plastic block can be easily transferred to the cutting table, the block in the soft state is capable of being easily cut by wires without putting undue strain on the wires during cutting. This is a great problem in the field. For instance, a concrete block may be cut into six parallel pieces and, if by happenstance, one of the wires should break, there will be two of the six pieces which are not completely severed. Since this will result in downtime in order to substitute a new cutting wire, the rate of production is adversely affected.

Another important factor to be considered is that by providing a method for transferring the block in a soft plastic state, relatively straight cuts can be obtained with the cutter wires. This is because, if the block is too hard, the wires tend to drift sidewards and produce a relatively uneven cut.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:
1. A method of manufacturing articles from lightweight concrete which comprises, forming a mass of lightweight concrete by pouring a concrete mix thereof in substantially the liquid state into a mould, allowing the mix to set and form a soft plastic block in the mould sufficient to sustain its own shape, disengaging said soft plastic block from the side walls of the mould, bringing at least one set of panels of lifting means in pressing relationship with opposed side surfaces of said soft plastic block, said panels being provided with gripping means at their inner surface which penetrate and conform deformably to the sides of said block, said lifting means having a suction-operable hood, the surface of which runs adjacent to and along the top surface of said soft plastic block, sealing the hood by peripheral contact with the top surface of the soft plastic block, causing said gripping means to penetrate and conformably deform to the opposed sides of said block, applying suction to the top of the block while the hood is in sealing arrangement therewith, and lifting and transporting said soft plastic block with minimum risk of damage while supporting said soft plastic block simultaneously by suction and by pressing relation of said set of panels.

2. A method of manufacturing articles from lightweight concrete which comprises, forming lightweight concrete by pouring a concrete mix thereof in substantially the liquid state into a mould, allowing said mix to set and form a soft plastic block in said mould sufficient to sustain its own shape, disengaging said soft plastic block from the side walls of the mould, bringing a set of clamping means in gripping relationship with said soft plastic block, said clamping means being provided with gripping means at their inner surfaces which penetrate and conform conformably to the sides of said clamping means having a suction-operable hood, the surface of which runs adjacent to and along the top surface of said soft plastic block, the hood having means around the peripheral edges thereof for making sealing suction-tight contact with the top surface of said soft plastic block, sealing the hood by peripheral contact with the top surface of the soft plastic block, causing said gripping means to penetrate and conformably deform to the opposed sides of said block, applying suction to the top of the block while the hood is in sealing arrangement therewith, and lifting and transporting said soft plastic block with minimum risk of damage by said clamping means while supporting said soft plastic block by suction without applying a large gripping force to the opposite sides of said soft plastic block.

References Cited
UNITED STATES PATENTS

| | | | |
|---|---|---|---|
| 3,178,791 | 4/1965 | Dickson et al. | 25—120X |
| 3,206,534 | 9/1965 | Vögele et al. | 264—336 |
| 3,117,815 | 1/1964 | Creskoff | 294—64 |

ROBERT F. WHITE, Primary Examiner

J. H. SILBAUGH, Assistant Examiner

U.S. Cl. X.R.

25—1; 264—313, 336